(12) United States Patent
Pant et al.

(10) Patent No.: US 9,589,298 B2
(45) Date of Patent: Mar. 7, 2017

(54) FINANCIAL ACCOUNT AUTHENTICATION

(71) Applicant: YODLEE, INC., Redwood City, CA (US)

(72) Inventors: Shubha Pant, Banglore (IN); Nikhil Nadkarni, Fremont, CA (US); Vinay Nagaraj, Santa Clara, CA (US); Jordan Reed, Carmichael, CA (US); Peter Hazlehurst, Foster City, CA (US)

(73) Assignee: Yodlee, Inc., Redwood City, CA (US)

( * ) Notice: Subject to any disclaimer, the term of this patent is extended or adjusted under 35 U.S.C. 154(b) by 616 days.

(21) Appl. No.: 13/773,498

(22) Filed: Feb. 21, 2013

(65) Prior Publication Data

US 2014/0236792 A1    Aug. 21, 2014

(51) Int. Cl.
*G06Q 40/00* (2012.01)
*G06Q 40/02* (2012.01)

(52) U.S. Cl.
CPC ............. *G06Q 40/00* (2013.01); *G06Q 40/02* (2013.01)

(58) Field of Classification Search
CPC ............................... G06Q 40/00; G06Q 40/02
See application file for complete search history.

(56) References Cited

U.S. PATENT DOCUMENTS

| | | |
|---|---|---|
| 2002/0099952 A1 | 7/2002 | Lambert et al. |
| 2003/0191964 A1 | 10/2003 | Satyavolu et al. |
| 2008/0005006 A1* | 1/2008 | Tritt ..................... G06Q 20/102 705/36 R |
| 2008/0015927 A1* | 1/2008 | Ramirez ......................... 705/10 |
| 2009/0089215 A1* | 4/2009 | Newton ........................... 705/76 |
| 2009/0320117 A1 | 12/2009 | Liu et al. |
| 2010/0138316 A1 | 6/2010 | Connors et al. |
| 2010/0257085 A1 | 10/2010 | Bowne et al. |

OTHER PUBLICATIONS

The University of Alaska staff, Managing Finance Reports With Vista Plus, Aug. 2008, The University of Alaska, web, 2-20.*
International Search Report and Written Opinion as received in International Patent Application No. PCT/US2014/017703, filed Feb. 21, 2014. 10 pages.

(Continued)

*Primary Examiner* — Marissa Liu
(74) *Attorney, Agent, or Firm* — Fish & Richardson P.C.

(57) ABSTRACT

Methods, systems, and apparatus, including computer programs encoded on computer storage media, for account authentication. A method includes receiving a user request to include financial data describing a financial account in an interface, the financial account being associated with a financial institution. The method further includes redirecting the user to a first webpage associated with the financial institution, where the user inputs into the first webpage login credentials for accessing the financial account. The method further includes, in response to the user inputting into the first webpage login credentials for accessing the financial account, receiving, from the financial institution, an access token other than the login credentials for accessing the financial account. The method further includes storing the access token for use in accessing and aggregating financial data describing the financial account.

33 Claims, 5 Drawing Sheets

(56) References Cited

OTHER PUBLICATIONS

Communication Pursuant to Article 94(3) EPC as received in copending European Patent Application No. 14 754 469.6, filed Aug. 27, 2015. 6 pages.
European Search Report as received in copending European Patent Application No. 14 754 469.6, filed Aug. 27, 2015. 5 pages.
Hardt, D. "The OAuth 2.0 Authorization Framework". Published Oct. 31, 2012. Retrieved from the Internet: URL <https://www.rfc-editor.org/rfc/pdfrfc/rfc6749.txt.pdf>. pp. 1-76.
LoginRadius. "How to obtain Twitter Consumer Key and Secret (Video Tutorial)". Published Jan. 30, 2013. Retrieved from the Internet: URL <https://www.youtube.com/watch?v=5PUC9yGS4RI>. 1 page.

* cited by examiner

FINANCIAL ACCOUNT AUTHENTICATION

TECHNICAL FIELD

This specification relates to authenticating user accounts for account aggregation.

BACKGROUND

As the Internet has grown in popularity, more users are turning to services provided over the Internet to help manage their finances. These services can be provided by financial institutions, such as banks or credit card companies, or by account aggregators who aggregate and present user-specific financial information from one or more financial institutions. Users typically use a user name and password to log-in to webpage(s) maintained by a financial institution or an account aggregator. From the webpage(s), the user can access online banking, electronic bill payment, account aggregation, and other online financial services. Online banking provides a user access to his or her financial information and also offers a number of services to a user. Users can, for example, view their statements online, including transaction details and cancelled checks, transfer balances online, and apply for loans online.

Users can also use electronic bill payment to pay bills online by transferring money from an account to a creditor through the Internet. Many financial institutions allow a user to pay all of his or her bills from their webpage(s). Users can also schedule payments to creditors from some financial institution webpages. Users can also authorize automatic payments to satisfy periodic financial obligations. A payment is made automatically when, for example, a biller charges a user account or debits a user account without direct user input (other than an initial authorization to make automatic payments). Account aggregation involves presenting financial information related to one or more accounts of a user in one place. Each account can be with a different financial institution. Account aggregation makes it easy for a user to quickly get a picture of his or her overall finances.

SUMMARY

This specification describes technologies relating to authenticating user accounts for financial account aggregation. Financial account aggregation generally requires storing, in an aggregation server system, user login credentials for user financial accounts with various financial institutions. Using stored user login credentials, the aggregation server system can access and aggregate user financial data from respective financial accounts, for example, through a financial institution website. However, storing user login credentials in an aggregation server system can potentially risk user financial data security in the event the aggregation server system is compromised.

Thus, in some implementations, the aggregation server system stores respective access tokens instead of user login credentials for use in accessing and aggregation user financial data from respective financial accounts. An access token for a user financial account corresponding to a financial institution can be obtained by redirecting the user to a webpage associated with the financial institution. The user can input the user's login credentials for accessing the financial account into the webpage. After the user inputs into the webpage the user's login credentials for accessing the financial account, the aggregation server system can receive, from the financial institution, the access token for accessing the financial account. In such implementations, the aggregation server system is associated with a consumer key that is configured to identify the aggregation server system to financial institution websites. This consumer key is associated with access tokens corresponding to user financial accounts for various financial institutions. Each consumer key corresponds to a particular financial institution's website (e.g., the website from which financial data will be aggregated). The consumer key for the particular financial institution's website will be the same for all users that have a financial account with the particular financial institution. However, each user that has a financial account with the particular financial institution will have a different access token for accessing the financial institution's website. Thus, there is a one-to-many relationship between a consumer key for a financial institution's website and access tokens for users having a financial account with the financial institution. Such a relationship is different from the OAuth open authentication framework in which there is a one-to-one relationship between a consumer key for a financial institution's website and an access token for a user that has a financial account with the financial institution.

In general, one aspect of the subject matter described in this specification can be embodied in methods that include the actions of receiving a user request to include financial data describing a financial account in an interface, the financial account being associated with a financial institution; redirecting the user to a first webpage associated with the financial institution, wherein the user inputs into the first webpage login credentials for accessing the financial account; in response to the user inputting into the first webpage login credentials for accessing the financial account, receiving, from the financial institution, an access token other than the login credentials for accessing the financial account; and storing the access token for use in accessing and aggregating financial data describing the financial account. Other embodiments of this aspect include corresponding systems, apparatus, and computer programs recorded on computer storage devices, each configured to perform the operations of the methods.

These and other embodiments can each optionally include one or more of the following features. The method further includes providing the access token to a second webpage associated with the financial institution; in response to providing the access token to the second webpage, obtaining, from the financial institution, financial data describing the financial account; and aggregating the obtained financial data for use in describing the financial account in the interface. The access token is configured to permit obtaining financial data for a specified time period. The method further includes determining that the specified time period has elapsed; in response to determining that the specified time period has elapsed, redirecting the user to a first webpage associated with the financial institution, wherein the user inputs into the first webpage login credentials for accessing the financial account; in response to the user inputting into the first webpage login credentials for accessing the financial account, receiving, from the financial institution, a second access token for accessing the financial account; and storing the second access token for use in aggregating financial data describing the financial account.

The second webpage is configured to be inaccessible through non-whitelisted network connections. The first webpage is configured to be accessible through at least some network connections that are non-whitelisted network connections for second webpage. The first webpage is not configured to accept access tokens. The access token is invalidated when the user changes the login credentials for accessing the financial account. The access token is invalidated when login credentials for accessing the financial account expire. The access token is configured to limit a level of access within the financial account. The access token is configured to restrict types of data that are accessible to the user.

Particular embodiments of the subject matter described in this specification can be implemented so as to realize one or more of the following advantages. An aggregation system can be configured to obtain a user's financial data from financial institutions without having to store the user's respective login credentials for the financial institutions. User login credentials no longer need to be stored on the aggregation system. The aggregation system can access user financial accounts using user-specific access tokens issued by financial institutions. Each access token can be configured to expire within a specific time period. User-specific access tokens can be used to limit the level of access within a financial account (e.g., a user can be restricted to read-only access to financial data without having any ability to transfer funds between accounts or to creditors). User-specific access tokens can be used to control the type of data that is accessible to a user (e.g., allowing a user to access account summary data and no transaction data). User-specific access tokens for a particular financial institution can be configured to expire when the respective users change their login credentials at the particular financial institution. User-specific access tokens for accounts at a particular financial institution can be configured to expire when there is a change in the status of the accounts (e.g., when a jointly held account becomes a single person's account or when an account is suspended).

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
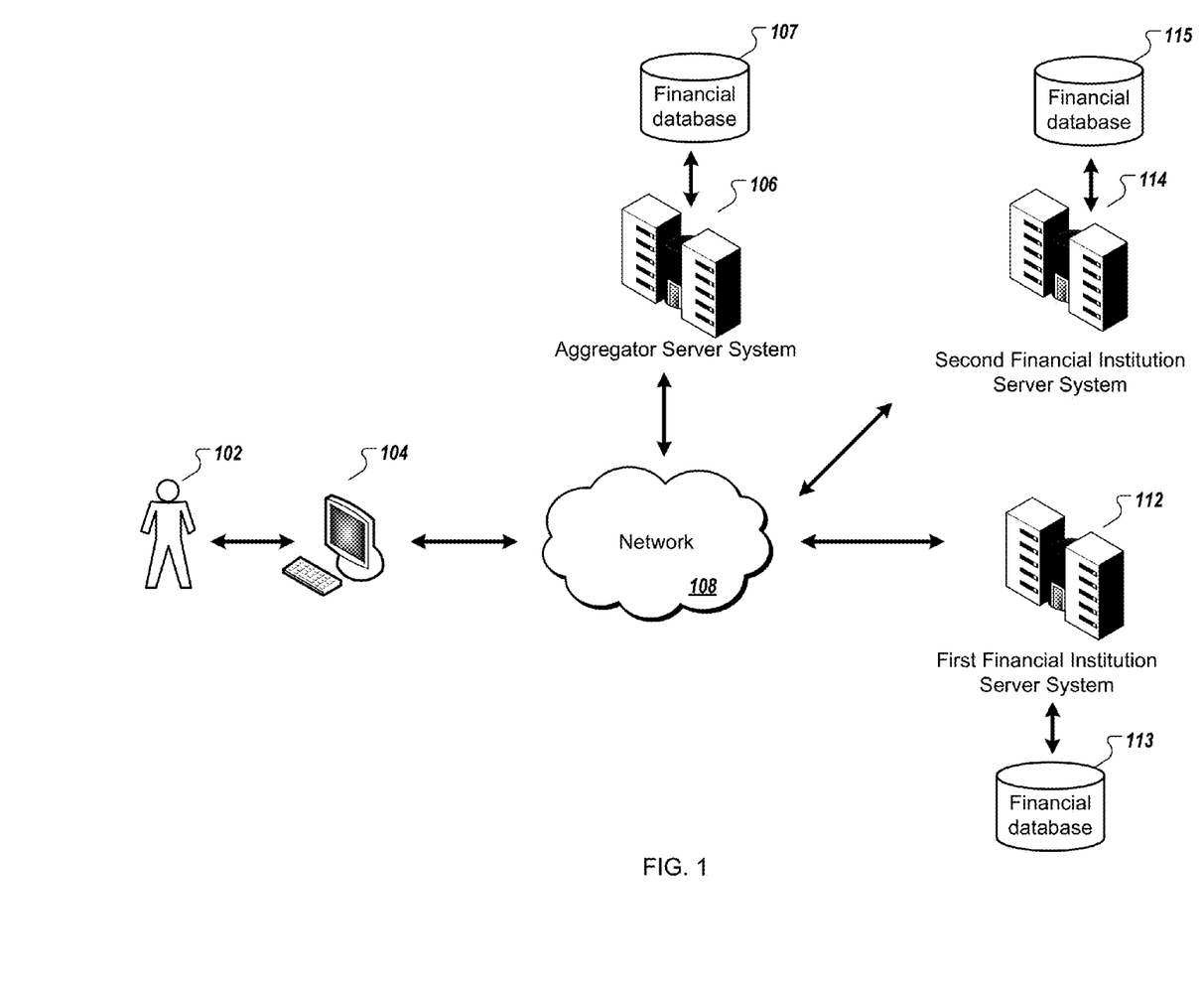
FIG. 1 illustrates an example aggregation system used to aggregate financial data.

FIG. 1 illustrates an example aggregation system used to aggregate financial data. One or more user devices, e.g., the user device 104, an aggregator server system 106, and one or more financial institution server systems, e.g., the systems 112 and 114, are connected through a network 108. Each user device, the aggregator server system 106, and each financial institution server system can include one or more computing devices.

Each financial institution is an institution that provides financial services, deals in financial instruments, or lends, invests, or stores money. Examples of financial institutions include banks, brokerage firms, credit card companies, credit unions, and savings and loans. Each financial institution stores, for example, in a respective database, e.g., the database 113 or 115, in communication with its respective server system, e.g., the system 112 or 114, financial information about users that have a financial account with the respective financial institution. The financial information can also be stored in a database, e.g., database 107, in communication with the aggregator server system 106 once a user has requested aggregation of their financial accounts on a financial institution server system, e.g., the system 112 or 114. A user can have an account with the financial institution when, for example, the user deposits money at the institution or has a line of credit provided by the financial institution.

Financial information, or financial data, includes, for example, customer data, account data, financial institution data, payee data, and transaction data. Customer data includes the customer's name and contact information, e.g., the customer's address, telephone number, and email address. Customer data can also include the customer's password or PIN. Account data includes the customer's account numbers, financial institutions, and account balances. The financial institution data includes the financial institution's name and address and the financial institution's ABA or routing number.

Users, e.g., the user 102, with respective accounts with one or more of the financial institutions can use one or more user devices, e.g., the user device 104, to access financial information related to their account with a financial institution. As described below, the users can access this information through an interface provided by the aggregator server system 106 or through an interface provided by a financial institution that includes data provided by the aggregator server system 106 as a backend provider.

Some examples of user devices include computers, tablets, and mobile devices, e.g., cellular phones. A user device can present a user interface through, for example, a computer program that presents data, e.g., text and images, in a format specified by the aggregator server system 106. In some implementations, the user interface is presented in a web browser. The web browser receives one or more webpages from the aggregator server 106 and presents the webpages to the user. Presenting the user interfaces to the user can include displaying the user interfaces on a computer monitor or other display device. Presenting the user interfaces can also include any other method of conveying information to the user, for example presenting sounds corresponding to the user interfaces or providing haptic feedback corresponding to the user interfaces.

The aggregator server system 106 runs applications that provide various services to users, including account aggregation, presentation of financial information, and automatic bill payments. The aggregator server system 106 can provide these services directly to a user either on its own behalf or on behalf of a financial institution. In situations where the aggregator server system 106 provides services directly to a user on behalf of a financial institution, it optionally brands communications it sends to the user's device 104 with the financial institution's logo, colors, or other information so that the user, viewing the communication on the user device 104, is given the impression that the user is interacting with the financial institution server 112 rather than the aggregator server system 106. In brief, the aggregator server system 106 can store data associating financial institutions with graphic images and color codes, e.g., in a database. When the aggregator server system 106 generates a user interface, e.g. a webpage, branded as a financial institution, the server 106 inserts the graphic images and color codes associated with the financial institution into the user interface that is then sent to the user, e.g., into a markup language document corresponding to a webpage.

Alternatively, the aggregator server system 106 can be configured as a backend provider and can provide software, support, and other tools to a financial institution to allow the financial institution to provide some or all these services to a user directly through, for example, the financial institution's website that is hosted on the financial institution's server system, e.g., the system 112. In some implementations, the aggregator server system 106 and a financial institution are the same entity, and the aggregator server system 106 and the financial institution server system 112 are the same system.

As used in this specification, account aggregation involves collecting financial information about a user. Data representing this information is optionally stored in a data repository, e.g., a database, on the aggregator server system 106, or on one or more financial institution server systems, e.g., the systems 112 and 114. Financial information can be collected in different ways. In some implementations, information is received directly from the system 112 or 114. In some implementations, the aggregator server system 106 runs one or more agents to extract user-specific financial information from various webpages and other consumer-accessible channels, for example public OFX feeds.

An agent is a computer program that extracts financial information by, for example, screen scraping by parsing the HTML code of webpages and identifying relevant information, or by extracting financial information from data feeds. A webpage is a block of data identified by a URL that is available on the Internet. One example of a webpage is a HyperText Markup Language (HTML) file. Webpages commonly contain content; however, webpages can also refer to content outside the webpage that is presented when the webpage loads in a user's web browser. Webpages can also generate content dynamically based on interactions with the user. A public OFX feed is a stream of financial data sent to another computer, for example, over the Internet, by a server of one or more financial institutions, where the data is formatted in accordance with the Open Financial Exchange standard. Other methods of gathering financial information are also envisioned.

When collecting financial information about a user 102 from a particular financial institution, the aggregator server system 106 typically logs into to the user's account on the financial institution's website using the user's login credentials, e.g., login and password, for the website. The process of how the aggregator server system 106 obtains a user's login credentials can vary depending on whether the aggregator server system 106 provides services directly to a user on its own behalf or on behalf of a financial institution, or as a backend provider.

For example, if the aggregator server system 106 is providing services on behalf of itself or on behalf of a financial institution, a user 102 accessing the aggregator server system 106 using a user device 104 interacts with an interface provided by the aggregator server system 106 to identify a financial institution and to login to the user's account for that financial institution. For example, the interface provided by the aggregator server system 106 can be a financial dashboard that presents financial information for the user's accounts on various financial institutions. The aggregator server system 106 can capture the user's login credentials and store them in a database, e.g., the database 107. The aggregator server system 106 can later use the stored login credentials to access and collect the user's financial information from the financial institution's website. This process can be repeated to configure the aggregator server system 106 to collect data from other financial institutions, e.g., the different financial institution server system 114, with which the user has accounts.

In another example, if the aggregator server system 106 is providing services to a particular financial institution as a backend provider, a user 102 using a user device 104 to access the particular financial institution's server system, e.g., the system 112, interacts with an interface provided by the particular financial institution to identify a different financial institution and to login to the user's account for the different financial institution. For example, the interface provided by the particular financial institution can be a financial dashboard that presents financial information for the user's accounts on various financial institutions. The user can identify a different financial institution, e.g., the system 114, with which the user has a financial account to be included in the financial dashboard.

In response to the user identifying the different financial institution, the interface can provide the user with a login interface for inputting login credentials for the user's account on the different financial institution. Once the user successfully inputs the user's login credentials, the aggregator server system 106 can capture the user's login credentials for the different financial institution and can store the login credentials in a database, e.g., the database 107. The aggregator server system 106 can later use the stored login credentials to access and collect the user's financial information from the different financial institution's website.

In some implementations, financial institution systems, e.g., the systems 112 and 114, are configured to generate and provide the aggregator server system 106 with an access token for accessing user accounts. Each access token is specific to each user and can be, for example, an alphanumeric string of characters. The access token can be generated in response to a user 102 successfully logging into the user's account for a financial institution, for example, through the financial institution's website. Access tokens can be generated using conventional token generating algorithms, including, for example, token generation capabilities provided in the OAuth open authorization framework. However, unlike OAuth tokens, the access tokens are persistent and last for longer than a single session, e.g., for one month to one year. Access tokens can be configured to limit the level of access within a financial account (e.g., a user can be restricted to read-only access to financial data without having any ability to transfer funds between accounts or to creditors). Access tokens can also be configured to control the type of data that is accessible to a user (e.g., allowing a user to access account summary data and no transaction data). Further, access tokens can be configured to expire when a user changes their login credentials at a particular financial institution. Additionally, access tokens can be configured to expire when there is a change in the status of a user's financial account (e.g., when a jointly held account becomes a single person's account or when an account is suspended).

For example, in some implementations, a user interacting with an interface provided by the aggregator server system 106 can request that the user's account with a financial institution 114 be included in an interface, e.g., a financial dashboard. Once the user request is received by the aggregator server system 106, the user is redirected to a user login interface that is provided by the financial institution 114. In some implementations, the user login interface is a user login webpage on the financial institution's website.

The redirecting of a user to a particular interface, e.g., the user login interface provided by the financial institution, can be accomplished, for example, by forwarding the user's request to the financial institution's server system and allowing the user to communicate directly with the financial institution's server system. In some implementations, users redirected to a financial institution's server system are presented with one or more interfaces, e.g., the user login interface, that are configured by the financial institution. For example, in such implementations, the financial institution configures the interfaces with the financial institution's logo, colors, or other information so that the user is given the impression that the user is interacting with the financial institution server system.

Once the user 102 inputs, into the user login interface, login credentials for accessing the user's account with the financial institution 114, the financial institution's server system 114 generates an access token for accessing the user's account with the financial institution 114. In such implementations, the access token is specific to the user and is different from the user's login credentials, e.g., username and password, but can still be used to access the user's account associated with the financial institution 114. The access token can be provided by the financial institution server system 114 to the aggregator server system 106 directly.

The aggregator server system 106 can store the access token in a database, e.g., the database 107, and can use the access token to provide services, e.g., account aggregation, for the user's account with the financial institution. When using the access token to access the user's account with the financial institution 114, the aggregator server system 106 interacts with a token login interface that is provided by the financial institution 114. In some implementations, the token login interface is a token login webpage on the financial institution's website 114 that is configured to accept and authenticate access tokens. Depending on the implementation, the token login interface can be any interface capable of accepting tokens for authentication (e.g., a web services interface, data feeds, etc.) In some implementations, the token login interface is configured to be accessible through one or more whitelisted networks and/or one or more whitelisted server systems. Additionally, the token login interface can be configured to be inaccessible through one or more blacklisted network connections and/or server systems.

In some implementations, the user login interface, e.g., the user login webpage, is configured to be accessible through at least some network connections that are not whitelisted network connections for the token login interface, e.g., the token login webpage. Further, in some implementations, the user login interface, e.g., the user login webpage, is configured to not accept access tokens as credentials for logging into the user's financial account associated with the financial institution.

In some implementations, a user can interact with an interface provided by a financial institution server system 112 to request that the user's account with a different financial institution 114 be included in an interface, e.g., a financial dashboard that is provided through the financial institution server system 112 or the aggregator server system 106. Once the user request is received, by the financial institution server system 112, the user is redirected to a user login interface that is provided by the different financial institution 114, as described above.

Once the user 102 inputs, into the user login interface, login credentials for accessing the user's account with the different financial institution 114, the different financial institution's server system 114 generates an access token for accessing the user's account with the different financial institution 114. The access token can be provided by the different financial institution server system 114 to the aggregator server system 106 directly or through the financial institution server system 112.

Figure 2:
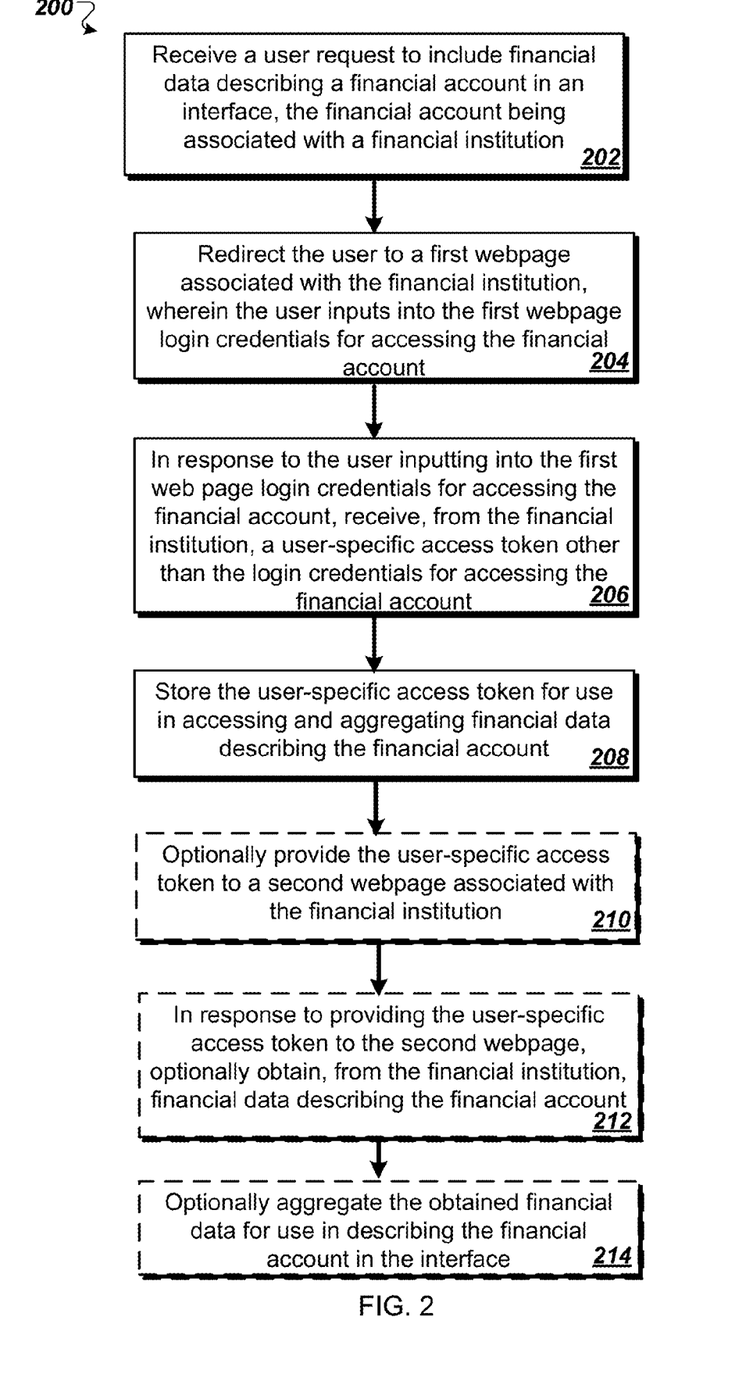
FIG. 2 illustrates an example method for obtaining an access token.

FIG. 2 illustrates an example method 200 for obtaining an access token. For convenience, the example method 200 will be described in reference to a system that performs the method 200. The system can be, for example, the aggregator server system 106.

The system receives a user request to include financial data describing a financial account in an interface, the financial account being associated with a financial institution (step 202). As described above, the user request can be received, for example, from a user operating a user device that is interacting with the system, e.g., the aggregator server system 106, or with a financial institution server system through a network.

The system redirects the user to a user login webpage associated with the financial institution and the user inputs into the user login webpage login credentials for accessing the financial account (step 204).

In response to the user inputting, into the user login webpage, login credentials for accessing the financial account, the system receives, from the financial institution, an access token other than the login credentials for accessing the financial account (step 206). The system can receive the access token, for example, through a network, e.g., the network 108.

In some implementations, the access token is configured to allow the system to access and obtain financial data from the financial account associated with the financial institution for a specified time period. The specified time period can be specified, for example, by the user or the financial institution. Further, the specified time period can be a specified number of minutes, hours, days, months, years, or can be for an unlimited time period.

The system stores the access token for use in accessing and aggregating financial data describing the financial account (step 208). The system can, for example, store the access token in a database, e.g., the database 107.

The system optionally provides the access token to a token login webpage associated with the financial institution (step 210). As described above, the system can use the access token to subsequently access the user's financial account associated with the financial institution for purposes of account aggregation. For example, when accessing the financial account, the system retrieves the user's access token for the financial institution from a database, e.g., the database 107, and inputs the access token into a token login webpage, as described above in reference to FIG. 1. The system can provide the access token to the financial institution's server system, e.g., the system 112 or 114, through a network, e.g., the network 108.

In response to providing the access token to the token login webpage, the system optionally obtains, from the financial institution, financial data describing the financial account (step 212). The financial institution's server system can authenticate the access token provided by the system and can allow the system to log into the user's financial account associated with the financial institution.

The system optionally aggregates the obtained financial data for use in describing the financial account in the interface (step 214). Upon being authenticated, the system can access and obtain financial data from the user's financial account associated with the financial institution. For example, as described above, the system can aggregate financial information that was obtained through screen scraping, e.g., parsing the HTML code, of webpages and identifying relevant information. Additionally, the system can also aggregate financial information that was extracted from data feeds.

In some implementations, the system determines that the specified time period for the access token has elapsed and, in response to determining that the specified time period has elapsed, the system again redirects the user to the user login webpage associated with the financial institution, as described above. The user inputs into the user login webpage the user's login credentials for accessing the financial account. In response to the user successfully inputting into the user login webpage login credentials for accessing the financial account, the financial institution's server system generates a new access token for accessing the user's financial account associated with the financial institution. The system then receives, from the financial institution, the new access token for accessing the financial account and stores the new access token for use in aggregating financial data describing the financial account.

Figure 3:
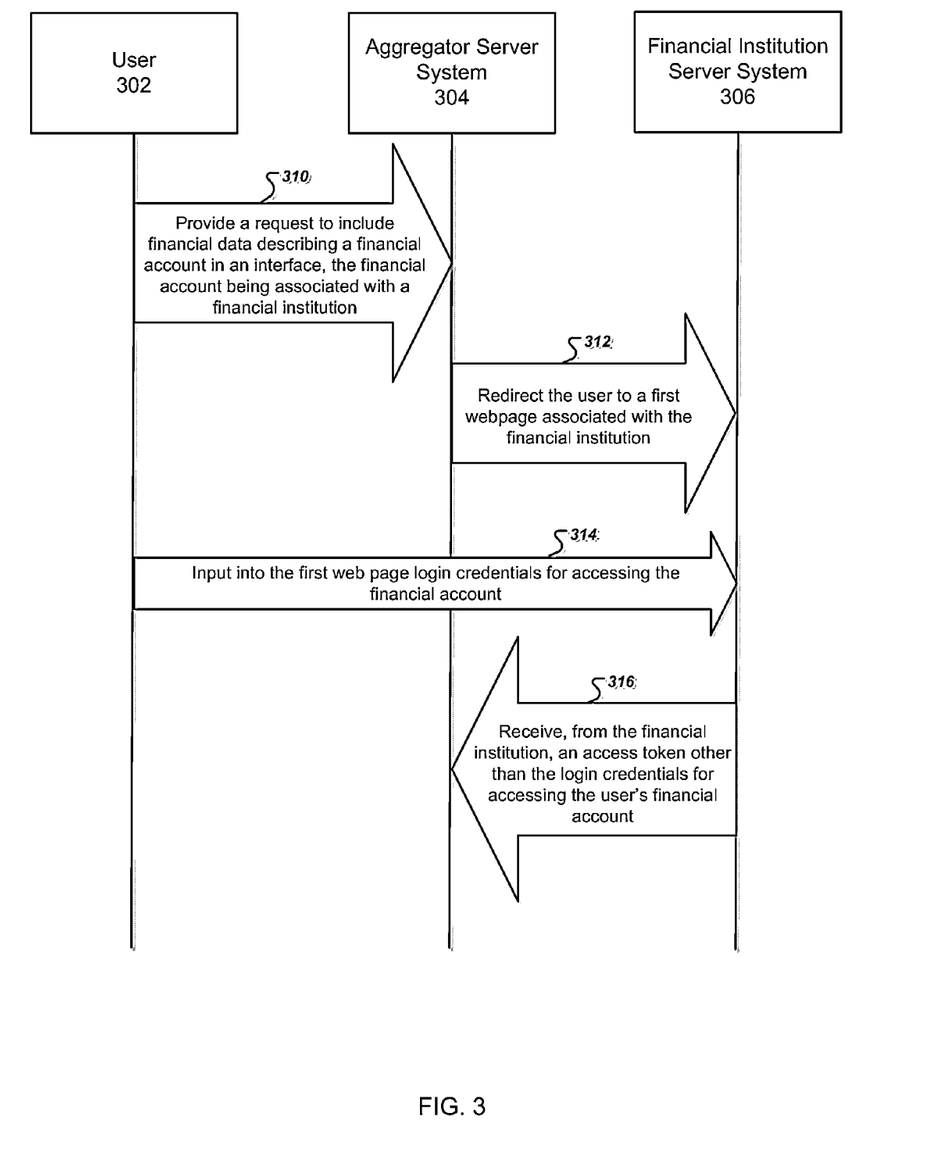
FIG. 3 illustrates an example flow diagram illustrating an example technique for obtaining an access token.

FIG. 3 illustrates an example flow diagram 300 illustrating an example technique for obtaining an access token.

A user 302 operating a user device provides a request to an aggregator server system 304, e.g., the system 106, to include financial data describing a financial account in an interface provided by the aggregator server system, the financial account being associated with a financial institution 306, e.g., the system 112 (step 310). The user request can be provided from a user device communicating over a network. As described above in reference to FIG. 1, in some implementations, the user 302 provides the request to a financial institution server system, e.g., the system 112, to include financial data describing a financial account associated with a different financial institution, e.g., the system 114, in an interface provided by the financial institution server system.

The aggregator server system 304 redirects the user to a user login webpage associated with the financial institution 306 (step 312).

The user inputs into the user login webpage the user's login credentials for accessing the financial account (step 314).

In response to the user inputting into the user login webpage login credentials for accessing the financial account, the financial institution server system 306 provides the aggregator server system 304 with an access token other than the login credentials for accessing the financial account (step 316). The aggregator server system 304 can store the access token for use in accessing and aggregating financial data describing the financial account.

Figure 4:
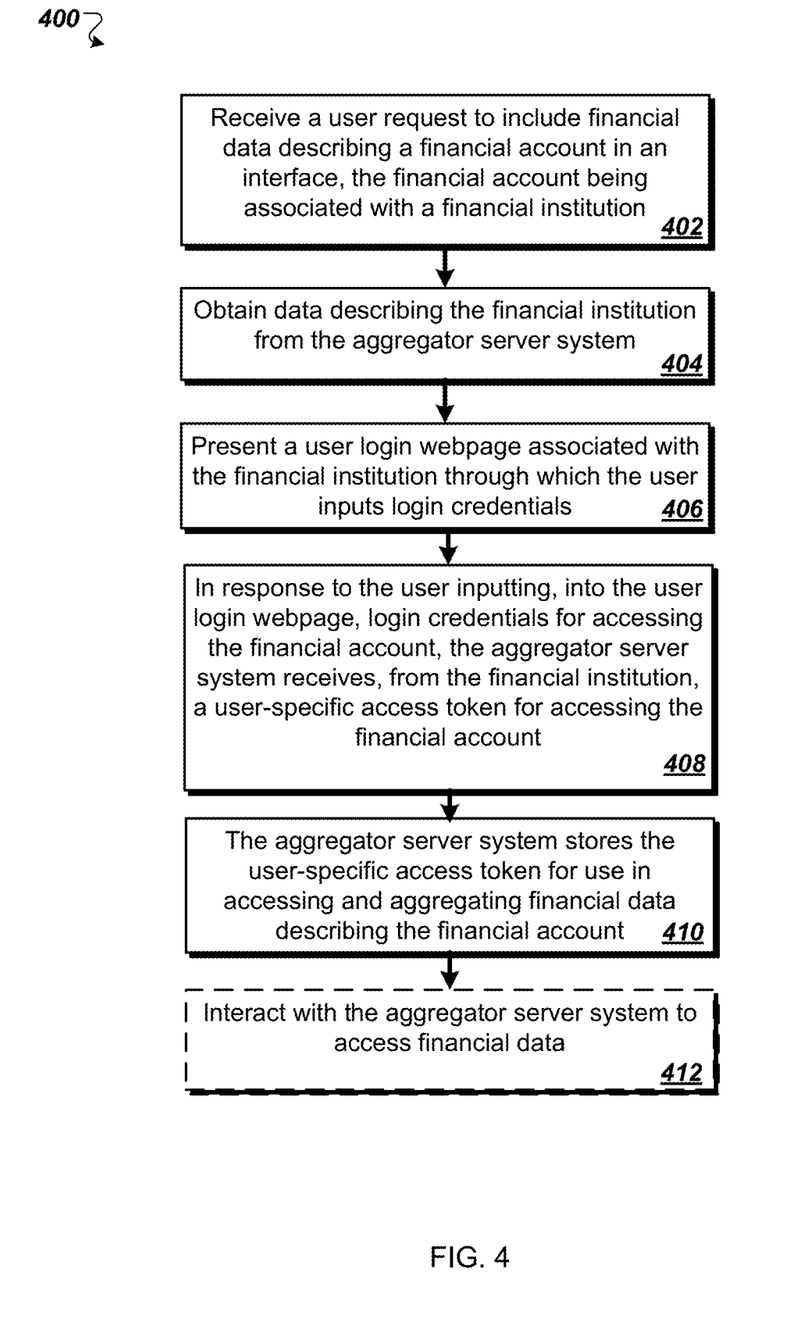
FIG. 4 illustrates an example flow diagram illustrating an example technique for obtaining an access token using a user device that is configured to interact with a financial institution website.

FIG. 4 illustrates an example method 400 for obtaining an access token using a user device that is configured to interact with a financial institution website. For convenience, the example method 400 will be described in reference to a user device (e.g., a mobile device) that performs the method 400. The user device includes an interface that is configured to allow the user to request aggregation of financial data that is associated with various financial institutions, and to present the aggregated financial data. In particular, the interface is configured to use an aggregation application programming interface (API) that allows the user device to interact with an aggregator server system (e.g., the aggregator server system 106).

The user device receives a user request to include financial data describing a financial account in an interface, the financial account being associated with a financial institution (step 402). The user request can be received, for example, from a user interacting with the user device through a graphical user interface. In some implementations, the user is presented with a listing of financial institutions from which financial data can be obtained in the interface. The user can select a financial institution from the listing to request aggregation of the user's financial data associated with the financial institution, and to have the aggregated financial data presented in the interface.

In response to the user request, the user device obtains data describing the financial institution from the aggregator server system (step 404). In some implementations, the user device can access a URL that is associated with the aggregator server system that is provided to the user device at the time of implementation. The user device can connect to the aggregator server system, for example, by connecting to the URL that is associated with the aggregator server system. One or more return URLs can also be provided to the user device that each reference a success and/or failure web page indicating whether the user device was or was not successful in authenticating the user with the financial institution.

The aggregator server system can provide the user device with data describing a URL for a user login webpage associated with the financial institution and a return URL associated with the aggregator server system. The financial institution can use the return URL associated with the aggregator server system to provide the aggregator server system with an access token for accessing the financial account on the financial institution, as described below. The access token is different from the user's login credentials. Additionally, the aggregator server system can redirect the user device to a URL corresponding to a success web page or a failure web page depending on whether the login credentials provided by the user were successful in authenticating the user with the financial institution or not.

User login webpage associated with the financial institution is presented at the user device and the user inputs into the user login webpage login credentials for accessing the financial account (step 406). The user device can present the user login webpage associated with the financial institution by, for example, connecting to the URL provided by the aggregator server system which redirects the user device to the actual login webpage of the financial institution.

In response to the user inputting, into the user login webpage, login credentials for accessing the financial account, the aggregator server system receives, from the financial institution, an access token other than the login credentials for accessing the financial account (step 408). The financial institution can provide the access token to the aggregator server system by communicating with the aggregator server system using the return URL associated with the aggregator server system.

The aggregator server system stores the access token for use in accessing and aggregating financial data describing the financial account (step 410). The system can, for example, store the access token in a database, e.g., the database 107.

The user device interacts with the aggregator server system using the API to access aggregated financial information (step 412). For example, the user device can use the API to request aggregation of the user's financial data that is associated with the financial institution. Further, the user device can use the API to request the aggregated financial data for presentation on the interface. The aggregator server uses the user's access token to access the user's financial data associated with the financial institution.

Figure 5:
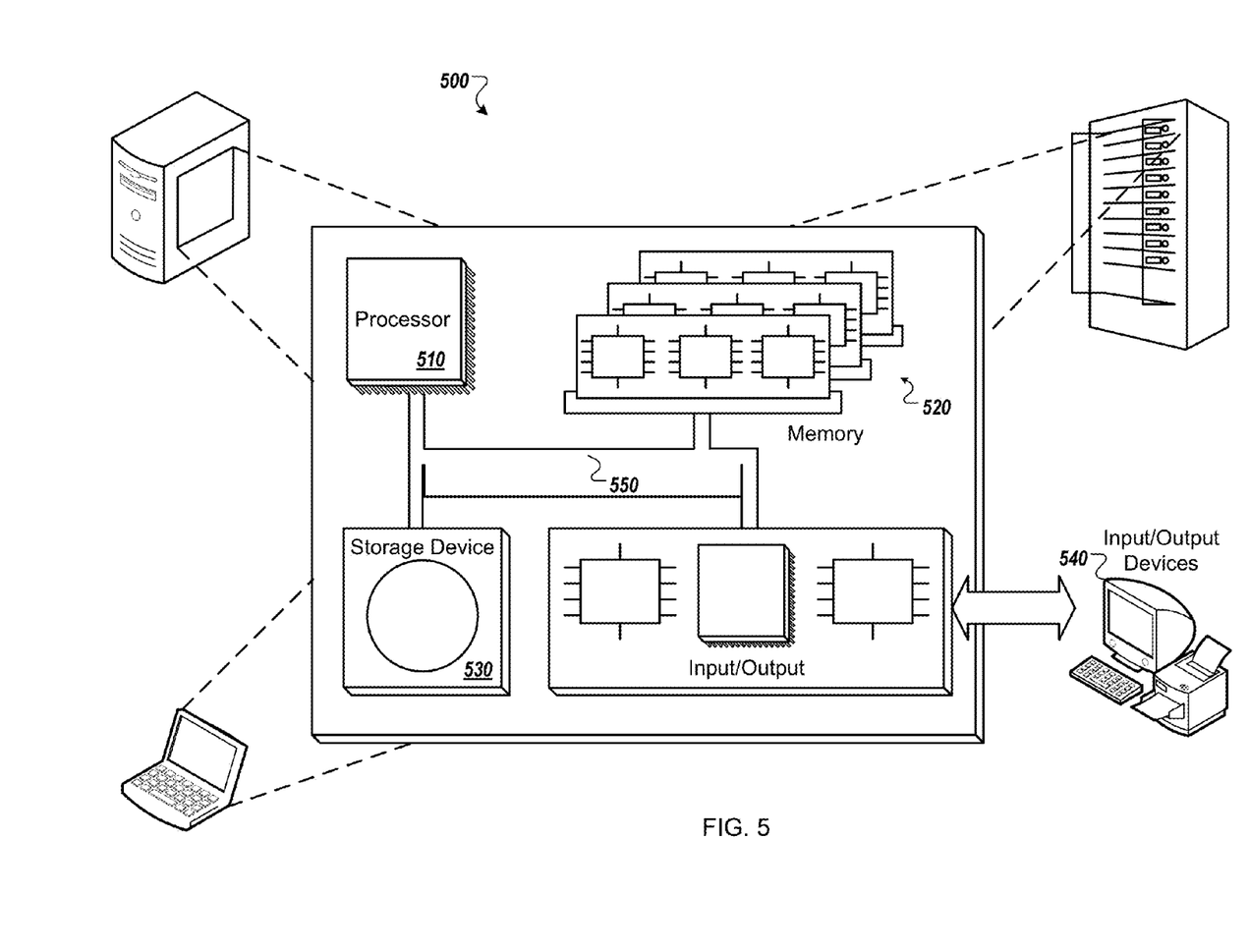
FIG. 5 is a schematic diagram of an example of a generic computer system.

FIG. 5 is a schematic diagram of an example of a generic computer system 500. The system 500 can be used for the operations described above. For example, the system 500 may be included in either or all of the aggregator's server system 106, the financial institution server systems 112 and 114, or the user device 104.

The system 500 includes a processor 510, a memory 520, a storage device 530, and an input/output device 540. Instructions that implement operations associated with the methods described above can be stored in the memory 520 or on the storage device 530. Each of the components 510, 520, 530, and 540 are interconnected using a system bus 550. The processor 510 is capable of processing instructions for execution within the system 500. In some implementations, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In another implementation, the memory 520 is a non-volatile memory unit.

The storage device 530 is capable of providing mass storage for the system 500. In some implementations, the storage device 530 is a computer-readable medium. In various different implementations, the storage device 530 may be a floppy disk device, a hard disk device, an optical disk device, or a tape device.

The input/output device 540 provides input/output operations for the system 500. In some implementations, the input/output device 540 includes a keyboard and/or pointing device. In another implementation, the input/output device 540 includes a display unit for displaying graphical user interfaces.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. The computer storage medium can be a machine-readable storage device, a machine-readable storage substrate, a random or serial access memory device, or a combination of one or more of them. Alternatively or in addition to being encoded on a storage medium, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
    receiving, at a server computer system other than a computer system of a financial institution, a user request from a user device of a user having a financial account at the financial institution to include financial account information, from the financial account of the user at the financial institution, in an interface;
    redirecting, by the server computer system, the user to a first webpage associated with the financial institution, wherein the user inputs into the first webpage login credentials to access financial account information of the user on the computer system of the financial institution;
    in response to the user inputting into the first webpage login credentials to access the financial account information, receiving, at the server computer system from the computer system of the financial institution, an access token other than the login credentials to access the financial account information; and
    storing, at the server computer system, the access token to access and aggregate the financial account information of the user.

2. The method of claim 1, further comprising:
    providing, by the server computer system, the access token to a second webpage associated with the financial institution;
    in response to providing the access token to the second webpage, obtaining, from the computer system of the financial institution and at the server computer system, financial account information of the user; and
    aggregating, at the server computer system, the obtained financial account information for use in describing the financial account in the interface.

3. The method of claim 2, wherein the access token is configured to permit obtaining financial account information for a specified time period.

4. The method of claim 3, further comprising:
    determining, at the server computer system, that the specified time period has elapsed;
    in response to determining that the specified time period has elapsed, redirecting, by the server computer system, the user to the first webpage associated with the financial institution, wherein the user inputs into the first webpage login credentials to access financial account information of the user on the computer system of the financial institution;
    in response to the user inputting into the first webpage login credentials to access the financial account information, receiving, at the server computer system from the computer system of the financial institution, a second access token to access the financial account information; and
    storing, at the server computer system, the second access token to access and aggregate the financial account information of the user.

5. The method of claim 2, wherein the second webpage is configured to be inaccessible through non-whitelisted network connections.

6. The method of claim 5, wherein the first webpage is configured to be accessible through at least some network connections that are non-whitelisted network connections for the second webpage.

7. The method of claim 1, wherein the first webpage is not configured to accept access tokens.

8. The method of claim 1, wherein the access token is invalidated when the user changes the login credentials for accessing the financial account.

9. The method of claim 1, wherein the access token is invalidated when login credentials for accessing the financial account expire.

10. The method of claim 1, wherein the access token is configured to limit a level of access within the financial account.

11. The method of claim 1, wherein the access token is configured to restrict types of data that are accessible to the user.

12. A non-transitory computer storage medium encoded with a computer program, the program comprising instructions that when executed by data processing apparatus cause the data processing apparatus to perform operations comprising:
- receiving, at a server computer system other than a computer system of a financial institution, a user request from a user device of a user having a financial account at the financial institution to include financial account information, from the financial account of the user at the financial institution, in an interface;
- redirecting, by the server computer system, the user to a first webpage associated with the financial institution, wherein the user inputs into the first webpage login credentials to access financial account information of the user on the computer system of the financial institution;
- in response to the user inputting into the first webpage login credentials to access the financial account information, receiving, at the server computer system from the computer system of the financial institution, an access token other than the login credentials to access the financial account information; and
- storing, at the server computer system, the access token to access and aggregate the financial account information of the user.

13. The computer storage medium of claim 12, further comprising:
- providing, by the server computer system, the access token to a second webpage associated with the financial institution;
- in response to providing the access token to the second webpage, obtaining, from the computer system of the financial institution and at the server computer system, financial account information of the user; and
- aggregating, at the server computer system, the obtained financial account information for use in describing the financial account in the interface.

14. The computer storage medium of claim 13, wherein the access token is configured to permit obtaining financial account information for a specified time period.

15. The computer storage medium of claim 14, further comprising:
- determining, at the server computer system, that the specified time period has elapsed;
- in response to determining that the specified time period has elapsed, redirecting, by the server computer system, the user to the first webpage associated with the financial institution, wherein the user inputs into the first webpage login credentials to access financial account information of the user on the computer system of the financial institution;
- in response to the user inputting into the first webpage login credentials to access the financial account information, receiving, at the server computer system from the computer system of the financial institution, a second access token to access the financial account information; and
- storing, at the server computer system, the second access token to access and aggregate the financial account information of the user.

16. The computer storage medium of claim 13, wherein the second webpage is configured to be inaccessible through non-whitelisted network connections.

17. The computer storage medium of claim 16, wherein the first webpage is configured to be accessible through at least some network connections that are non-whitelisted network connections for the second webpage.

18. The computer storage medium of claim 12, wherein the first webpage is not configured to accept access tokens.

19. The computer storage medium of claim 12, wherein the access token is invalidated when the user changes the login credentials for accessing the financial account.

20. The computer storage medium of claim 12, wherein the access token is invalidated when login credentials for accessing the financial account expire.

21. The computer storage medium of claim 12, wherein the access token is configured to limit a level of access within the financial account.

22. The computer storage medium of claim 12, wherein the access token is configured to restrict types of data that are accessible to the user.

23. A system comprising one or more computers programmed to perform operations comprising:
- receiving, at a server computer system other than a computer system of a financial institution, a user request from a user device of a user having a financial account at the financial institution to include financial account information, from the financial account of the user at the financial institution, in an interface;
- redirecting, by the server computer system, the user to a first webpage associated with the financial institution, wherein the user inputs into the first webpage login credentials to access financial account information of the user on the computer system of the financial institution;
- in response to the user inputting into the first webpage login credentials to access the financial account information, receiving, at the server computer system from the computer system of the financial institution, an access token other than the login credentials to access the financial account information; and
- storing, at the server computer system, the access token to access and aggregate the financial account information of the user.

24. The system of claim 23, further comprising:
- providing, by the server computer system, the access token to a second webpage associated with the financial institution;
- in response to providing the access token to the second webpage, obtaining, from the computer system of the financial institution and at the server computer system, financial account information of the user; and
- aggregating, at the server computer system, the obtained financial account information for use in describing the financial account in the interface.

25. The system of claim 24, wherein the access token is configured to permit obtaining financial account information for a specified time period.

26. The system of claim 25, further comprising:
- determining, at the server computer system, that the specified time period has elapsed;
- in response to determining that the specified time period has elapsed, redirecting, by the server computer system, the user to the first webpage associated with the financial institution, wherein the user inputs into the first webpage login credentials to access financial account information of the user on the computer system of the financial institution;
- in response to the user inputting into the first webpage login credentials to access the financial account information, receiving, at the server computer system from the computer system of the financial institution, a second access token to access the financial account information; and storing, at the server computer system, the second access token to access and aggregate the financial account information of the user.

27. The system of claim 24, wherein the second webpage is configured to be inaccessible through non-whitelisted network connections.

28. The system of claim 27, wherein the first webpage is configured to be accessible through at least some network connections that are non-whitelisted network connections for the second webpage.

29. The system of claim 23, wherein the first webpage is not configured to accept access tokens.

30. The system of claim 23, wherein the access token is invalidated when the user changes the login credentials for accessing the financial account.

31. The system of claim 23, wherein the access token is invalidated when login credentials for accessing the financial account expire.

32. The system of claim 23, wherein the access token is configured to limit a level of access within the financial account.

33. The system of claim 23, wherein the access token is configured to restrict types of data that are accessible to the user.

* * * * *